Feb. 7, 1967 P. G. PEROTTO 3,303,469

METHOD AND APPARATUS FOR READING CHARACTERS

Original Filed June 26, 1961

INVENTOR
PIER GIORGIO PEROTTO
BY Kenyon & Kenyon
ATTORNEYS

United States Patent Office 3,303,469
Patented Feb. 7, 1967

3,303,469
METHOD AND APPARATUS FOR READING CHARACTERS

Pier Giorgio Perotto, Turin, Italy, assignor to Ing. C. Olivetti & C. S.p.A., Ivrea, Italy, a corporation of Italy Continuation of application Ser. No. 119,432, June 26, 1961. This application Nov. 12, 1965, Ser. No. 516,189
10 Claims. (Cl. 340—146.3)

This is a continuation of application Serial No. 119,-432 filed June 26, 1961.

The present invention relates to a method and apparatus for reading characters, each one being represented by a group of $n+1$ marks printed, e.g., with a magnetizable ink. Each character is scanned by a reading head to produce a series of $n+1$ reading pulses, wherein the interval between each pair of contiguous pulses may have either a long or a short duration, so as to define a series of $n$ binary digits representing said character, as disclosed in the article, "Direct Reading for Data Processing," published in "Electronic Engineering," February 1960, page 95.

The method according to the invention comprises the steps of converting said series of reading pulses into a series of significant pulses each one corresponding to one of said intervals and having a corresponding duration, individually integrating said significant pulses to produce a corresponding series of amplitude modulated pulses, converting said series of amplitude modulated pulses into a series of binary digits, said significant pulses being used as synchronizing pulses for transferring said binary digits to a storage register.

The novel features of the invention will become apparent from the following description of a preferred embodiment thereof, taken in conjunction with the accompanying drawings, in which.

Figure 2:
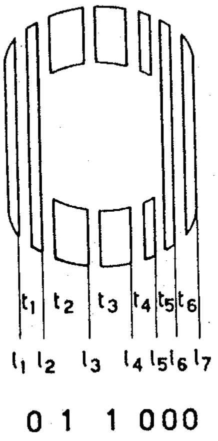
FIG. 2 shows a printed character.

Each character, such as the character "0" shown in FIG. 2, is formed of a predetermined number $n+1$ (e.g. seven) of vertical marks which define seven significant lines $l_1$, $l_2$, $l_3$, $l_4$, $l_5$, $l_6$ and $l_7$, each line being coincident for example with the right-hand edge of a mark.

The spacing between two adjacent lines may be either wide or narrow, whereby each character defines $n$ (six according to the present embodiment) wide or narrow intervals, the arrangement of the wide intervals with respect to the narrow ones being a distinctive feature of the character.

Figure 3:
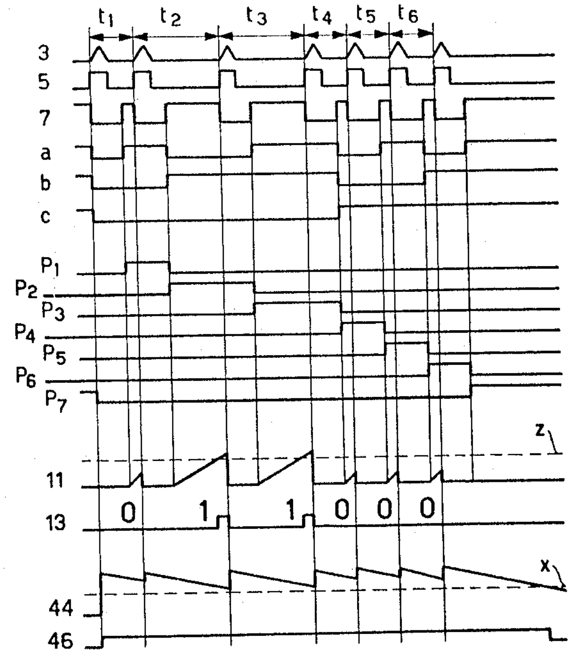
FIG. 3 shows a time diagram of some signals occurring when reading the character of FIG. 2.

The character of FIG. 2 comprises, from left to right, a narrow interval, two wide intervals and three narrow intervals. Therefore, the binary representation 011000 may be associated with the character "0." The characters, which are printed with magnetizable ink, are first magnetized and then scanned by a magnetic head (FIG. 1) having its gap parallel to the significant lines. The magnetic head, due to its relative motion with respect to the character, provides an output signal at every passage from a magnetized mark to the blank paper, thus producing a series of seven output signals corresponding to the lines $l_1$, $l_2$, $l_3$, $l_4$, $l_5$, $l_6$ and $l_7$. Said signals, which are designated with the numeral 3 in FIG. 3, are first amplified by an amplifier 2, and then reshaped by a Schmitt trigger of the type disclosed by J. Millman and H. Taub in the book "Pulse and digital circuits," 1956, p. 164 to 168, from which trigger a corresponding series of seven reading pulses is obtained, as indicated in FIG. 3 with the numeral 5.

The leading edge of each reading pulse energizes a monostable or one-shot multivibrator 6; more particularly, the output of the multivibrator 6, which in the steady state is energized so as to have a positive voltage level, is deenergized by each one of said leading edges and thereafter it remains in the deenergized state during a time period slightly shorter than the time interval corresponding to the narrow significant intervals of the character, whereupn it automatically reverts to the steady-state positive level.

The waveform so obtained on the output 7 comprises, as indicated with the numeral 7 in FIG. 3, a positive pulse during each one of the significant intervals $t_1$, $t_2$, $t_3$, $t_4$, $t_5$ and $t_6$, the width of each pulse being equal to the corresponding interval minus the period of the multivibrator 6. Therefore, when scanning a character, a series of six significant pulses representing the character is obtained at the output 7, the ratio between the duration of the long pulses and the duration of the short pulses being increased, so as to enable them to be easily distinguished.

Through a coincidence circuit 8 the six significant pulses are fed to an integrating circuit comprising a condenser 10 and the resistance 9 of the coincidence circuit, whereby a saw-tooth pulse is obtained on the output 11 for each significant pulse, said saw-tooth pulse having a final amplitude proportional to the duration of said pulse, as indicated in FIG. 3 with the numeral 11. Therefore, the previous representation of the character consisting of a series of six wide or narrow intervals is converted into a representation consisting of a series of six corresponding "high" or "low" pulses. Said series of amplitude modulated pulses is fed to an amplitude discriminator which produces a pulse on an output lead 13 when the amplitude of the incoming pulse overcomes a predetermined threshold level $z$ intermediate between the final amplitudes of the "high" and "low" significant pulses. Therefore, the amplitude discriminator produces on the output 13 a pulse corresponding to each "high" pulse, and thus a series of binary digits "one" and "zero" as indicated with the numeral 13 in FIG. 3. Such a series coincides with the binary representation of the character, as previously defined.

The six binary digits are respectively stored in six flip-flops 14, 15, 16, 17, and 18 and 19 of a register 20 under the control of a pulse distributor 21 driven by the significant pulses 7, which also act as synchronizing pulses.

The pulse distributor 21 comprises a counter 22 consisting of a chain of three flip-flops 23, 24, 25; a first series of seven "and" gates 26, 27, 28, 29, 30, 31 and 32 and a second series of six "and" gates 33, 34, 35, 36, 37 and 38.

Figure 1:
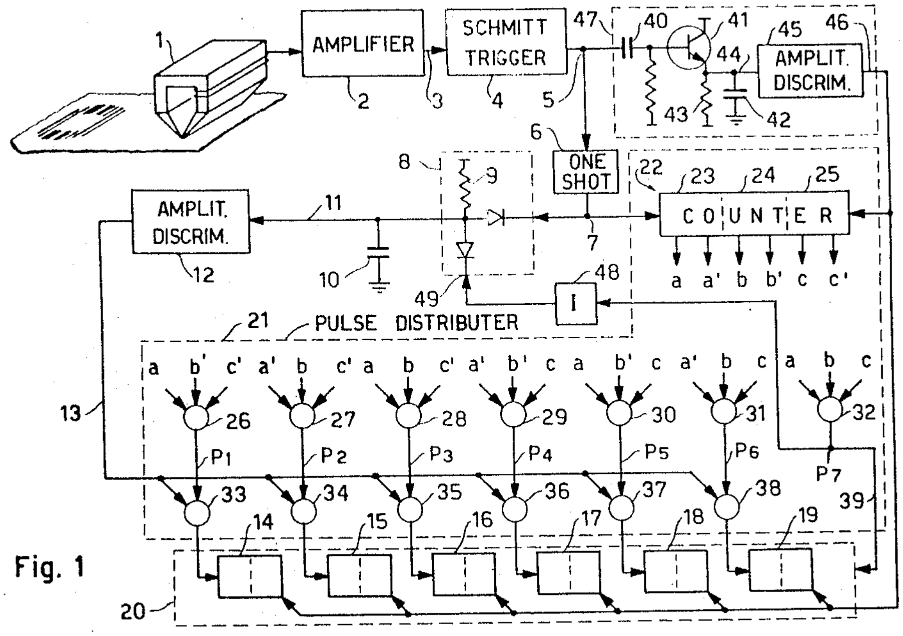
FIG. 1 shows a block diagram of the apparatus according to the invention.

The seven leading edges of the significant waveform 7 act each one as a counting pulse for the counter 22, whose outputs $a$, $a'$ $b$, $b'$ $c$ and $c'$ are decoded by the first series of "and" gates 26, 27, 28, 29, 30, 31 and 32, said gates being connected to the output leads of the counter 22 as shown in FIG. 1.

It will thus be clear that the output $P_1$ of the gate 26 is in its energized state only during the interval from the first to the second counting pulse, the output $P_2$ of the gate 27 is in its energized state only during the interval from the second to the third counting pulse, and so on, the output $P_7$ of the gate 32 being in its energized state only during the interval from the seventh counting signal to the first counting signal of the following series.

Therefore each signal $P_1$, $P_2$, $P_3$, $P_4$, $P_5$ and $P_6$ is produced coincidentally with the corresponding significant pulse 7, and hence also coincidentally with the corresponding saw-tooth pulse 11 and the corresponding binary digit 13. The signals $P_1$, $P_2$, $P_3$, $P_4$, $P_5$ and $P_6$ sequentially open the gates 33, 34, 35, 36, 37 and 38 respectively, said gates further receiving through the common line 13 the series of six binary digits produced by the amplitude discriminator 12. Therefore, the gates 33, 34, 35, 36, 37 and 38 distribute said digits to the corresponding six flip-flops of the register 20, wherein they are stored.

Each reading pulse produced by the Schmitt trigger 4 is sent through a coupling condenser 40 and an emitter follower 41 to charge a condenser 42 to a predetermined potential level. As said pulse terminates, the condenser 42 discharges through the resistance 43. The terminal 44 of the condenser 42 is connected to a second amplitude discriminator 45 which is arranged to produce a signal only when the input signal undergoes a threshold level $x$ lower than said predetermined level.

The discharge time of the condenser 42 is such that the terminal 44 discharges from said predetermined level to said threshold level in a time slightly longer than the longest significant interval of the character.

Therefore, when scanning a character, the condenser 42 is charged by the first reading pulse, and each one of the following reading pulses restores the charge of the condenser, whereby a series of saw-tooth pulses is obtained at the terminal 44, as shown in FIG. 3.

As the time between two adjacent pulses is not sufficient to allow the condenser to discharge under the threshold level of the discriminator 45, a signal 46 is obtained on the output 46, said signal beginning at the first reading pulse and terminating after the seventh pulse.

Generally the signal on the output 46 begins in response to each reading pulse which is spaced from the preceding pulse through an extent which is longer than the longest significant interval. The leading edge of the signal 46 is used to reset the counter 22 and the register 20 before reading a character.

The circuit 47 comprising the condenser 42 and the amplitude discriminator 45 acts as a protection circuit, as described later.

The operation of the apparatus while reading the character "0" will be described.

The first reading pulse produced by the Schmitt trigger 4 charges the condenser 42 and thus energizes the output 46 of the amplitude discriminator 45. The leading edge of the signal 46 resets the counter 22 to the state $a=b=c=0$, so as to bring the output of the gate 32 in the state $P_7=0$, and further resets the register 20. The output of the gate 32, through an inverter 48 energizes the input lead 49 of the gate 8, whereby the significant pulses 7 may be transmitted to the integrating circuit 9, 10. Simultaneously, said first reading pulse energizes the monostable multivibrator 6, whose output is thus driven from the steady-state positive level to a negative level. After a time interval equal to the period of the multivibrator, said output reverts to the posiive level, and the corresponding leading edge acts as a counting signal for the counter 22, thus starting the first signals $P_1$ on the output of the gate 26. In the meantime the signal obtained on the output 7 is integrated by the circuit 9, 10, thus giving on the output 11 a saw-tooth pulse.

Thereupon the second reading pulse energizes the second time the multivibrator 6, whereby the signal on its output 7 extinguishes, and the saw-tooth pulse which is obtained on the output 11 by integrating said signal ceases rising.

As the first significant interval $t_1$ was a narrow one, said saw-tooth pulse does not overcome the threshold $z$, whereby no pulse is obtained on the output 13: therefore, the binary digit representing the first significant interval is "0." This digit is stored in the flip-flop 14 through the gate 33, which is opened by the signal $P_1$.

Thereafter, when the multivibrator 6 reverts to the steady state, the counter 22 receives the second counting pulse, whereby the output $P_1$ is deenergized and the output $P_2$ is energized.

The signal on the output 7 is further integrated, thus producing on the output 11 a second saw-tooth pulse, which is discontinued by the third reading pulse.

As the second significant interval was a wide one, the second saw-tooth pulse overcomes the threshold $z$ before extinguishing, whereby a pulse is produced on the output 13: therefore, the binary digit representing the second significant interval is "1." This dgiit is stored in the flip-flop 15 through the gate 34, which is opened by the signal $P_2$.

The next following four reading pulses operate in a similar way.

When reading a regular character, seven reading pulses are produced, whereby at the end of the reading operation the counter 22 after receiving the seventh counting pulse energizes the output $P_7$. The signal $P_7$ is fed to the register 20 as a gating signal to allow the contents of said register to be transferred to an output device not shown in the drawings.

The protection circuit 47 eliminates errors due to the reading of non significant marks.

Suppose now the magnetic head 1 senses an ink spot before scanning a character.

Without the circuit 47 the spot and the lines $l_1$ to $l_6$ of the first six marks of the character would be mistaken for the seven significant lines of an inexistent character. The output 46 of the circuit 47 is first energized by the spot, but it is deenergized before scanning the character: thereafter, as it is energized again by the first reading signal due to the sensing of the first significant line $l_1$, it cancels the register 20, thus depriving its contents of any significance.

Further suppose that the character wrongly comprises less than seven marks and is followed by non significant marks. After reading the marks of the character, the signal 46 extinguishes before the counter 22 activates the output $P_7$. Therefore, the register 20 does not receive the gating signal $P_7$, whereby reading-out is inhibited. The first following reading pulse, whether it be produced by a character or by a disturbing spot, by energizing again the output 46 cancels the register 20, thus depriving the wrong character read by the head of any significance.

What is claimed is:

1. Apparatus for reading printed characters each one represented by a group of $n+1$ marks, comprising:

(a) a scanning head for producing a series of $n+1$ reading pulses responsive to said marks, the interval between each pair of contiguous reading pulses having either a long or a short duration, (b) means for converting said series of reading pulses into a series of significant pulses each one corresponding to one of said intervals and having a corresponding duration, (c) means for individually integrating said significant pulses to produce a corresponding series of saw-tooth amplitude modulated pulses, (d) an amplitude discriminator for converting said series of amplitude modulated pulses into a series of binary digits, (e) a storage register, and (f) synchronizing means responsive to said significant pulses for transferring said binary digits to said storage register.

2. Apparatus for reading printed characters each one represented by a group of $n+1$ marks, comprising:

(a) a scanning head for producing a series of $n+1$ reading pulses responsive to said marks, the interval between each pair of contiguous reading pulses having either a long or a short duration, (b) a monostable multivibrator fed by said series of reading pulses to produce a series of significant pulses each one corresponding to one of said intervals and having a corresponding duration, (c) means for individually integrating said significant pulses to produce a corresponding series of saw-tooth amplitude modulated pulses, (d) an amplitude discriminator for converting said series of amplitude modulated pulses into a series of binary digits, (e) a storage register, and (f) synchronizing means responsive to said significant pulses for transferring said binary digits to said storage register.

3. Apparatus for reading printed characters each one represented by a group of $n+1$ marks, comprising:

(a) a scanning head for producing a series of $n+1$ reading pulses responsive to said marks, the interval between each pair of contiguous reading pulses having either a long or a short duration, (b) means for converting said series of reading pulses into a series of significant pulses each one corresponding to one of said intervals and having a corresponding duration, (c) means for individually integrating said significant pulses to produce a corresponding series of saw-tooth amplitude modulated pulses, (d) an amplitude discriminator for converting said series of amplitude modulated pulses into a series of binary digits, (e) a storage register, (f) synchronizing means responsive to said significant pulses for transferring said binary digits to said register, (g) a counter responsive to the $(n+1\text{st})$ reading pulse to produce a gating signal for reading out the contents of said register, and (h) means responsive to each reading pulse which is spaced from the preceding reading pulse through an extent which is longer than said long interval to provide a reset signal for said register and for said counter.

4. Apparatus for reading printed characters each one represented by a group of $n+1$ marks, the spacing between each pair of contiguous marks being either wide or narrow, comprising in combination:

(a) a scanning head for producing a series of $n+1$ reading pulses responsive to said marks, respectively, the interval between each pair of contiguous reading pulses having either a long or a short duration according to said spacing, (b) means for generating a series of saw-tooth pulses, said means being responsive to each reading pulse to discontinue a saw-tooth pulse and to start a subsequent saw-tooth pulse, whereby the final amplitude of said last mentioned saw-tooth pulse has either a high or a low value according to the duration of the interval beginning with said reading pulse, (c) an amplitude discriminator for converting each one of said saw-tooth pulses into a binary digit according to the value of its amplitude, (d) a storage register, (e) and synchronizing means responsive to said reading pulses for transferring said binary digits to said storage register.

5. Apparatus for reading printed characters each one represented by a group of $n+1$ marks, the spacing between each pair of contiguous marks being either wide or narrow, comprising in combination:

(a) a scanning head for producing a series of $n+1$ reading pulses responsive to said marks, respectively, the interval between each pair of contiguous reading pulses having either a long or a short duration according to said spacing, (b) means responsive to said reading pulses for producing a series of binary digits, each one representing the duration of one of said intervals, (c) a storage register, (d) means for transferring said binary digits to said register, (e) counting means responsive to the $(n+1\text{st})$ reading pulse to produce a gating signal for reading out the contents of said register, (f) and means responsive to each reading pulse which is spaced from the preceding reading pulse through an extent which is longer than said long interval to provide a reset signal for said register and for said counting means.

6. Apparatus for reading printed characters each one represented by a group of $n+1$ marks, the spacing between each pair of contiguous marks being either wide or narrow, the spacing between two contiguous marks of two different characters being wider than said wide spacing, comprising in combination:

(a) a scanning head for producing a series of $n+1$ reading pulses responsive to said $n+1$ marks respectively, the interval between each pair of contiguous reading pulses having either a long or a short duration according to said spacing, (b) means responsive to said reading pulses for producing a series of binary digits, each digit representing the duration of one of said intervals, (c) a storage register, (d) synchronizing means responsive to said reading pulses for transferring said binary digits to said register, (e) counting means responsive to the $(n+1\text{st})$ reading pulse to produce a gating signal for reading out the contents of said register, (f) means for generating a series of saw-tooth pulses, said last mentioned means being responsive to each reading pulse to discontinue a saw-tooth pulse and to start a subsequent saw-tooth pulse, whereby the final amplitude of said last mentioned saw-tooth pulse has a value depending upon the duration of the interval beginning with said last mentioned reading pulse, (g) and means responsive to each saw-tooth pulse having a final amplitude greater than that corresponding to said wide intervals for providing a reset signal for said register and for said counting means.

7. Apparatus for reading printed characters each one represented by a group of $n+1$ marks, the spacing between each pair of contiguous marks being either wide or narrow, comprising in combination:

(a) a scanning head for producing a series of $n+1$ reading pulses responsive to said marks respectively, the interval between each pair of contiguous reading pulses having either a long or a short duration according to said spacing, (b) time measuring means responsive to said reading pulses to provide a series of $n$ signals representing the duration of said intervals respectively, (c) means responsive to said signals for comparing the duration represented by said signals with predetermined limit values to obtain a corresponding series of digits each one having a value which depends upon whether the corresponding duration approaches said long or short duration respectively, (d) and means for converting said series of digits into parallel form.

8. Apparatus for reading printed characters each one represented by a group of $n+1$ marks, the spacing between each pair of contiguous marks being either wide or narrow, comprising in combination:

(a) a scanning head for producing a series of $n+1$ reading pulses responsive to said marks, respectively, the interval between each pair of contiguous reading pulses having either a long or a short duration according to said spacing, (b) means responsive to said reading pulses for producing a series of digits representing the duration of said intervals respectively, (c) a storage register,
(d) means for transferring said digits to said register,
(e) and means responsive to each reading pulse which is spaced from the next preceding reading pulse through an extent which is longer than said long interval to provide a reset signal for said register.

9. Apparatus for reading printed characters each one represented by a group of $n+1$ marks, the spacing between each pair of contiguous marks being either wide or narrow, comprising in combination:
(a) a scanning head for producing a series of $n+1$ reading pulses responsive to said marks, respectively, the interval between each pair of contiguous reading pulses having either a long or a short duration according to said spacing,
(b) means for generating a series of saw-tooth pulses, said means being responsive to each reading pulse to discontinue a saw-tooth pulse and to start a subsequent saw-tooth pulse, whereby the final amplitude of said last mentioned saw-tooth pulse has either a high or a low value according to the duration of the interval beginning with said reading pulse,
(c) an amplitude discriminator for converting each one of said saw-tooth pulses into a digit according to the value of its amplitude,
(d) a storage register,
(e) and means for transferring said digits to said storage register.

10. Apparatus for reading printed characters each one represented by a group of $n+1$ marks, the spacing between each pair of contiguous marks being either wide or narrow, comprising in combination:
(a) a scanning head for producing a series of $n+1$ reading pulses responsive to said marks respectively, the interval between each pair of contiguous reading pulses having either a long or a short duration according to said spacing,
(b) time measuring means responsive to said reading pulses to provide a series of signals representing the duration of said intervals respectively,
(c) means responsive to said signals for comparing the durations represented by said signals with predetermined limit values to obtain a corresponding series of digits each one having a value which depends upon whether the corresponding duration approaches said long or short duration respectively,
(d) a multidenominational storage register,
(e) and synchronizing means responsive to said reading pulses for transferring said digits into different denominations of said storage register respectively.

No references cited.

MAYNARD R. WILBUR, *Primary Examiner.*

J. E. SMITH, *Assistant Examiner.*